United States Patent
Stapleton et al.

(10) Patent No.: US 9,038,206 B2
(45) Date of Patent: May 26, 2015

(54) UNIVERSAL COMMODE PROCESSING UNIT

(75) Inventors: Thomas J. Stapleton, Southwick, MA (US); Kenneth P. Flynn, Enfield, CT (US); Wayne G. Savage, Tolland, CT (US); David G. Converse, Hampden, MA (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 567 days.

(21) Appl. No.: 13/483,311

(22) Filed: May 30, 2012

(65) Prior Publication Data

US 2013/0318700 A1     Dec. 5, 2013

(51) Int. Cl.
| | | |
|---|---|---|
| E03D 1/00 | (2006.01) | |
| B01D 19/00 | (2006.01) | |
| E03D 5/014 | (2006.01) | |
| E03D 5/016 | (2006.01) | |
| B64G 1/60 | (2006.01) | |

(52) U.S. Cl.
CPC ............ *B01D 19/0052* (2013.01); *E03D 5/014* (2013.01); *E03D 5/016* (2013.01); *B64G 1/60* (2013.01)

(58) Field of Classification Search
CPC .... E03D 5/014; E03D 5/016; B01D 19/0052; B64G 1/60
USPC ........................ 4/316, 318, 319, 321, DIG. 19
See application file for complete search history.

(56) References Cited

U.S. PATENT DOCUMENTS

| | | | |
|---|---|---|---|
| 3,259,917 A | * | 7/1966 | Rascov ............................. 4/319 |
| 3,276,679 A | | 10/1966 | Booth |
| 5,192,428 A | | 3/1993 | Lindstrom |
| 5,413,705 A | | 5/1995 | Tammera et al. |
| 5,484,521 A | | 1/1996 | Kramer |
| 5,622,621 A | | 4/1997 | Kramer |
| 5,894,608 A | | 4/1999 | Birbara |
| 6,258,215 B1 | | 7/2001 | Samsonov et al. |
| 6,638,437 B2 | | 10/2003 | Terrien et al. |
| 7,272,941 B2 | | 9/2007 | TeGrotenhuis et al. |
| 7,481,935 B2 | | 1/2009 | Olivier |

FOREIGN PATENT DOCUMENTS

WO          9723270          7/1997

OTHER PUBLICATIONS

Liquid/Gas Separator Handles Varying Loads NTIS Tech Notes, US Department of Commerce, Springfield, VA, US, Aug. 1, 1992, p. 565, XP00325255, ISSN: 0889-8464.
European Search Report for application No. 13169540.5 titled: Universal Commode Processing Unit completed on Oct. 2, 2013.

* cited by examiner

*Primary Examiner* — Tuan N Nguyen
(74) *Attorney, Agent, or Firm* — Carlson, Gaskey & Olds, P.C.

(57) ABSTRACT

A waste collection unit includes a motor supported by a housing. A fan is coupled to the motor by a first member configured to provide a rotational input speed. A liquid-gas separator is coupled to a second member configured to provide a rotational output speed. A speed reduction device is coupled to the first and second members. The speed reduction device is configured to provide a rotational output speed that is less than the rotational input speed. In another embodiment, the fan is arranged in the housing and is directly coupled to the motor by the first member. The fan includes first and second sides respectively including first and second pumping elements. A first waste collection line fluidly connects a urinal to the first side. A second waste collection line fluidly connects a fecal storage container to the second side.

18 Claims, 1 Drawing Sheet

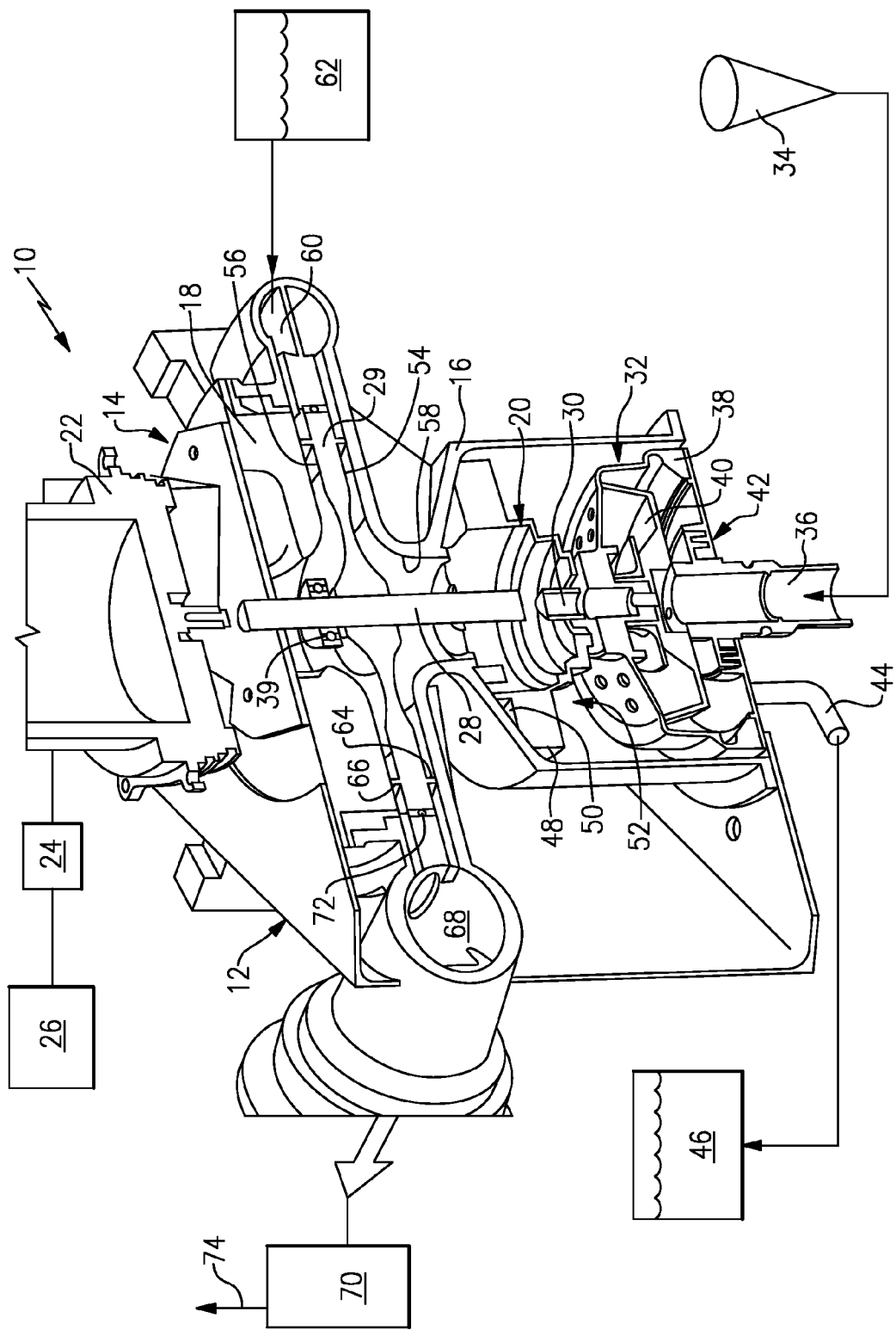

UNIVERSAL COMMODE PROCESSING UNIT

BACKGROUND

This disclosure relates to a waste processing unit suitable for using in micro-gravity environments, for example.

For micro-gravity environments, such as in a space vehicle, human waste collection is very difficult. Typically, a motor driven fan is used to pull in fecal matter air and odor and to provide this air to a filter. A motor driven separator pulls in urine and centrifugally separates the urine from the air. The collected urine is stored or vented overboard. Another motor driven fan is used to deliver the urine-separated air to the filter.

The problem with the above solution is that each rotating device, often two fans and one separator are separately driven by a discrete motor and motor controller, which consumes a lot of volume, weight and cost.

SUMMARY

In one example embodiment, a waste collection unit includes a motor supported by a housing. A fan is coupled to the motor by a first member configured to provide a rotational input speed. A liquid-gas separator is coupled to a second member configured to provide a rotational output speed. A speed reduction device is coupled to the first and second members. The speed reduction device is configured to provide a rotational output speed that is less than the rotational input speed.

In another example embodiment, a waste collection unit includes a motor supported by a housing. A fan is arranged in the housing and is directly coupled to the motor by a first member configured to provide a rotational input speed. The fan includes first and second sides respectively including first and second pumping elements. A first waste collection line fluidly connects a urinal to the first side. A second waste collection line fluidly connects a fecal storage container to the second side.

BRIEF DESCRIPTION OF THE DRAWINGS

The disclosure can be further understood by reference to the following detailed description when considered in connection with the accompanying drawings wherein:

FIG. 1 is a schematic view of an example waste processing unit for a waste handling system.

DETAILED DESCRIPTION

A waste handling system 10 is schematically illustrated in FIG. 1. The system 10 includes a waste processing unit 12 having a housing 14. It should be understood that the housing 14 may include one or more housing portions secured to one another for ease of assembly and servicing. In one example, the housing 14 includes a separator housing portion 16 and a fan housing portion 18 that are integral with one another.

A speed reduction device, such as gearbox assembly 20, is arranged within the housing 14 and includes an outer diameter 48 supported by the housing 14. A motor 22 is mounted on the housing 14 and is driven by a motor controller 24 that is connected to a power source 26. A first member, such as first shaft 28, is coupled to the motor 22 and directly to a fan 29 arranged in the fan housing portion 18. The gearbox assembly 20 is driven by the first shaft 28, which supports one end of the first shaft 28. The other end of the first shaft 28 is supported by a bearing 39 mounted in the housing 18.

A second member, such as second shaft 30, couples the gearbox assembly 20 to a separator assembly 32, which mechanically separates a gas-entrained liquid, such as a urine/air mix. In this manner, a common motor is used to rotationally drive both a fan and a separator. The first shaft 28 provides a rotational input speed that is greater than a rotational output speed provided by the second shaft 30. In one example, the gearbox assembly 20 provides a gear reduction from the first shaft 28 to the second shaft 30, for example, approximately 3:1 reduction. In this manner, the fan 29 may be driven at a higher rotational speed, for example, 10,000 RPM than the separator assembly 32, which may rotate at about 3200 RPM. Other speed rotors may be used, depending upon application, for example. The speed reduction allows the fan 29 to be driven at high speed enabling a smaller fan diameter, and enables the separator assembly 32 to rotate at a low speed, which avoids frothing of the urine.

A urinal 34 is fluidly connected to a urine/air inlet 36 in the housing 14 near the separator assembly 32 via a first waste connection line. The separator assembly 32, which is arranged in the housing 14, includes a bowl 38 with a screen 40. A labyrinth seal 42 is provided between the separator assembly 32 and the housing 14. The bowl 38 rotates, which drives the urine radially outward under centrifugal force to an outlet 44, such as a pitot tube. The outlet 44 is connected to a urine collection container, such as bag or tank 46. Air separated from the bowl 38 flows through the screen 40 through passages in the separator 52. The air flows through openings 50 in the gearbox assembly 20 to a fan air inlet 58.

The fan 29 includes first and second sides 54, 56, each respectively including first and second pumping elements 64, 66 arranged back-to-back on a common fan disc. In this manner, a single fan is used to pump gases from two different sources. A tip seal 72 seals an outer periphery of the fan 29 to the housing 14, which separates the first and second pumping elements 64, 66 into discrete pumping chambers, which continue until the air combines at the exit of the fan housing 68. Air from the air inlet 58 is expelled radially outward by the first pumping element 64 to a common outlet 68. A fecal matter collection container 62 is in communication with an air inlet 60, via a second waste connection line, on the second side 56 of the fan 29. The second pumping element 66 directs the air from the air inlet 60 to the common outlet 68. Air that is separated from the urine and the fecal matter flows from the common outlet 68 to a filter 70. The filter 70 neutralizes odor and bacteria. The neutralized air may be expelled from a vent 74 back to the cabin, for example.

Although an example embodiment has been disclosed, a worker of ordinary skill in this art would recognize that certain modifications would come within the scope of the claims. For that reason, the following claims should be studied to determine their true scope and content.

What is claimed is:

1. A waste collection unit comprising:
   a motor supported by a housing;
   a fan coupled to the motor by a first member configured to provide a rotational input speed;
   a liquid-gas separator coupled to a second member configured to provide a rotational output speed; and
   a speed reduction device coupled to the first and second members, the speed reduction device configured to provide a rotational output speed that is less than the rotational input speed.

2. The waste collection unit according to claim 1, wherein the housing includes a fan housing portion enclosing the fan, and a separator housing portion enclosing the separator, the speed reduction device arranged in the housing.

3. The waste collection unit according to claim 2, wherein the speed reduction device is a gearbox.

4. The waste collection unit according to claim 3, wherein the rotational input speed is approximately three to four times the rotational output speed.

5. The waste collection unit according to claim 2, wherein the first member is a first shaft that is supported at one end by a bearing mounted to the housing and at another end by the speed reduction device.

6. The waste collection unit according to claim 2, wherein the second member is a second shaft that is supported at one end by the speed reduction device and at another end by the separator.

7. The waste collection unit according to claim 6, wherein the speed reduction device includes an opening fluidly connecting the separator to the fan and configured to provide a gas from the separator to the fan.

8. The waste collection unit according to claim 1, comprising a waste collection line fluidly connected to the fan and configured to provide a gas, the fan configured to pump the gas from the waste collection line to an outlet.

9. The waste collection unit according to claim 8, comprising a filter fluidly connected to the outlet and configured to neutralize the gas.

10. The waste collection unit according to claim 8, wherein the waste collection line is fluidly connected to a fecal matter storage container.

11. The waste collection unit according to claim 8, wherein the waste collection line is fluidly connected to a urinal.

12. The waste collection unit according to claim 1, comprising a first waste collection line fluidly connecting a urinal to the fan, and a second waste collection line connecting a fecal matter storage container to the fan, the fan configured to provide gases from the first and second waste collection lines to a common outlet.

13. The waste collection unit according to claim 12, wherein the fan includes first and second sides respectively including first and second pumping elements, the first and second pumping elements respectively in fluid communication with the first and second waste collection lines.

14. The waste collection unit according to claim 13, comprising a urine collection container fluidly connected to the separator.

15. A waste collection unit comprising:
a motor supported by a housing;
a fan arranged in the housing and directly coupled to the motor by a first member configured to provide a rotational input speed, wherein the fan includes first and second sides respectively including first and second pumping elements; and
a first waste collection line fluidly connecting a urinal to the first side; and
a second waste collection line fluidly connecting a fecal storage container to the second side.

16. The waste collection unit according to claim 15, wherein the first and second pumping elements are arranged in separate pumping chambers, and the fan is connected to a common outlet provided in the housing.

17. The waste collection unit according to claim 16, comprising a filter fluidly connected to the outlet and configured to neutralize gases from the first and second waste collection lines.

18. The waste collection unit according to claim 15, comprising a liquid-gas separator arranged within the housing and coupled to a second member and configured to provide a rotational output speed, the separator fluidly connected to the first waste collection line, a speed reduction device coupled to the first and second members, the speed reduction device configured to provide a rotational output speed that is less than the rotational input speed, and the speed reduction device includes an opening fluidly connecting the separator to the fan and configured to provide a gas from the separator to the fan.

* * * * *